Patented Oct. 10, 1939

2,175,988

UNITED STATES PATENT OFFICE 2,175,988

EMULSIFIABLE OIL

Marcellus T. Flaxman, Wilmington, Calif., assignor to Union Oil Company of California, Los Angeles, Calif., a corporation of California No Drawing. Application November 23, 1936, Serial No. 112,291

5 Claims. (Cl. 167—43)

This invention relates to the production of so-called "soluble" oils or emulsifiable oils adapted for use in agricultural and other connections.

The object of the invention is to produce soluble oils having satisfactory emulsifying and wetting properties, whereby they may be emulsified readily and when applied will wet the surface properly. For example, when employed as agricultural or horticultural spray oils, they will emulsify readily with large quantities of water and when applied to foliage of plants will spread and break well as is desired in this type of work.

This invention resides in an ordinary mineral spray oil containing a relatively small quantity of undecylenic acid. For many purposes about 1% of acid is employed in the usual and well known highly refined mineral spray oil having an unsulfonatable residue of 85% to 90% or higher, or somewhat lower refined mineral spray oil. For some uses it may be desirable to use considerably more than 1% of said undecylenic acid, for example as high as 4% or 5%, and in other instances it may be desirable to use even less, for example 0.5%.

Such oils are produced by merely adding the acid to the oil with sufficient agitation to insure complete distribution. Such oils are readily emulsifiable in large quantities of water according to the usual procedure without the addition of soap or other auxiliary emulsifying agent. For example, 2% or 3% of the oil may be combined with 98% or 97% of water as commonly done and agitated to produce an emulsion and applied to plant life by spraying.

Ordinary commercial grades of undecylenic acid have been used having an acid number of about 142 mg. KOH per gram and a specific gravity at 60° F. of about 0.92. Other grades may, of course, be employed. Also, these soluble oils may be used for other purposes to which emulsifiable oils of this character are adaptable.

It is to be understood that this disclosure is illustrative of the generic invention and is not to be taken as limiting beyond the scope of the appended claims.

I claim:

1. An emulsifiable oil comprising a mineral spray oil containing a relatively small quantity of undecylenic acid sufficient to impart good emulsifying, wetting and spreading properties.

2. An emulsifiable oil comprising a mineral spray oil containing a small quantity of undecylenic acid in the order of about 1% of the acid.

3. A soluble oil having emulsifying, wetting and spreading properties comprising a refined mineral oil containing about 0.5% to about 5% of commercial undecylenic acid.

4. A highly refined mineral oil containing a small percentage of undecylenic acid sufficient to impart good emulsifying, wetting and spreading properties.

5. An emulsifiable oil comprising as primary constituents a highly refined mineral spray oil and a small percentage less than about 5% of undecylenic acid sufficient to impart good emulsifying, wetting and spreading characteristics to the oil.

MARCELLUS T. FLAXMAN.